United States Patent [19]

Eck et al.

[11] 4,397,968

[45] Aug. 9, 1983

[54] PROCESS FOR THE MANUFACTURE OF COPOLYMERS HAVING INCREASED RESISTANCE AGAINST HYDROLYSIS, THE COPOLYMERS AND THEIR USE

[75] Inventors: Herbert Eck; Klaus Adler; Manfred Hannebaum; Wilhelm Lechner, all of Burghausen, Fed. Rep. of Germany

[73] Assignee: Wacker-Chemie GmbH, Munich, Fed. Rep. of Germany

[21] Appl. No.: 327,351

[22] Filed: Dec. 4, 1981

[30] Foreign Application Priority Data

Mar. 24, 1981 [DE] Fed. Rep. of Germany ....... 3111602

[51] Int. Cl.$^3$ .............................................. C08K 9/00
[52] U.S. Cl. .................................. 523/305; 524/459; 526/202
[58] Field of Search ....................... 523/305; 524/459; 526/202

[56] References Cited

U.S. PATENT DOCUMENTS

| | | | |
|---|---|---|---|
| 2,227,163 | 12/1940 | Starck et al. | 260/32 |
| 2,773,050 | 12/1956 | Caldwell et al. | 524/459 |
| 3,051,668 | 8/1962 | Bauer et al. | 524/459 |
| 3,198,775 | 8/1965 | Delacretaz et al. | 260/85.5 |

FOREIGN PATENT DOCUMENTS

| | | |
|---|---|---|
| 2049291 | 4/1972 | Fed. Rep. of Germany . |
| 1144152 | 3/1969 | United Kingdom . |
| 1155275 | 6/1969 | United Kingdom . |

OTHER PUBLICATIONS

Chemical Abstracts, Band 73, No. 12, 21 (Sep.1970), Seite 10, No. 56589y.
ELVANOL ® Polyvinyl Alcohol, DuPont, p. 27.

*Primary Examiner*—Joseph L. Schofer
*Assistant Examiner*—N. Sarofin
*Attorney, Agent, or Firm*—Hammond & Littell, Weissenberger and Muserlian

[57] ABSTRACT

A process for the production of an aqueous dispersion stabilized by a water-soluble polyvinyl alcohol and based on copolymers that comprise at least 60% by weight of monomer units selected from the group consisting of esters of acrylic acid, esters of methacrylic acid, styrene, and substituted styrene and mixtures thereof, consisting essentially of subjecting a stabilized dispersion of a monomer mixture containing at least 60% by weight of monomers selected from the group consisting of esters of acrylic acid, esters of methacrylic acid, styrene, substituted styrene and mixtures thereof, said dispersion being an aqueous dispersion stabilized by a water-soluble polyvinyl alcohol, to polymerization at a temperature in excess of 60° C. in the presence of a free-radical-forming catalyst selected from the group consisting of (a) organic catalysts soluble in the monomers and also being at least partially water-soluble, optionally in combination with water-soluble reducing agents and (b) peroxosulfur catalysts, in such a manner that, during the entire duration of the reaction, said monomer mixture is supplied at such a rate by metering in the monomer mixture in the form of a previously obtained emulsion, that the monomer concentration is maintained at less than 20% by weight, based on the total weight of the reaction mixture, and recovering said stabilized dispersion; as well as the aqueous dispersion produced by the process, the use of the aqueous dispersions as a binder in dispersion dyes and adhesives, the said binder having increased resistance against hydrolysis on drying due to the special manufacturing process.

7 Claims, No Drawings

PROCESS FOR THE MANUFACTURE OF COPOLYMERS HAVING INCREASED RESISTANCE AGAINST HYDROLYSIS, THE COPOLYMERS AND THEIR USE

BACKGROUND OF THE INVENTION

The invention relates to stable aqueous dispersions based on fine-particled (co)polymers of styrenes and/or of acrylic and/or methacrylic acid esters which, when dried as a film, have increased resistance against hydrolysis owing to the special manufacturing process.

In U.S. Pat. No. 2,227,163, a process has already been proposed for the polymerization, at elevated temperature, of monomeric compounds in the presence of a high-molecular-weight polyvinyl alcohol or a water-soluble derivative thereof, with the aid of hydrogen peroxide. Carrying out that process with the monomers of the present invention resulted, however, in completely useless dispersions full of a coarse-grained coagulate. In particular, dispersions having solids contents of greater than 35% by weight, especially greater than 40% by weight, could not be prepared without those dispersions suddenly becoming rheopectic or coagulating.

From GB-PS 1 155 275, on the other hand, a process is known for the manufacture of copolymers in which latices are first prepared in the presence of an emulsifier and, at conversions of from 20% to 80%, a protective colloid, such as polyvinyl alcohol, is added. In that case, the polyvinyl alcohol serves only as an additional stabilizer. It is not possible, according to that process, to manufacture stable dispersions with the protective colloid being added earlier since the mixture then coagulates (Comparison Test B).

OBJECTS OF THE INVENTION

An object of the present invention is the obtaining of aqueous dispersions based on polymers which are stabilized during manufacture, preferably only by a polyvinyl alcohol, and which comprise at least 60% by weight of (meth)acrylic acid ester units and/or styrene units.

Another object of the present invention is the development of a process for the production of an aqueous dispersion stabilized by a water-soluble polyvinyl alcohol and based on copolymers that comprise at least 60% by weight of monomer units selected from the group consisting of esters of acrylic acid, esters of methacrylic acid, styrene, and substituted styrene and mixtures thereof, consisting essentially of subjecting a stabilized dispersion of a monomer mixture containing at least 60% by weight of monomers selected from the group consisting of esters of acrylic acid, esters of methacrylic acid, styrene, substituted styrene and mixtures thereof, said dispersion being an aqueous dispersion stabilized by a water-soluble polyvinyl alcohol, to polymerization at a temperature in excess of 60° C. in the presence of a free-radical-forming catalyst selected from the group consisting of (a) organic catalysts soluble in the monomers and also being at least partially water-soluble, optionally in combination with water-soluble reducing agents and (b) peroxosulfur catalysts, in such a manner that, during the entire duration of the reaction, said monomer mixture is supplied at such a rate by metering in the monomer mixture in the form of a previously obtained emulsion, that the monomer concentration is maintained at less than 20% by weight, based on the total weight of the reaction mixture, and recovering said stabilized dispersion.

A further object of the present invention is the use of the above dispersions as a binder in dispersion dyes and adhesives.

These and other objects of the present invention will become more apparent as the description thereof proceeds.

DESCRIPTION OF THE INVENTION

The above objects have been achieved and the drawbacks of the prior art have been overcome by the process of the invention, being a process for the production of an aqueous dispersion stabilized by a water-soluble polyvinyl alcohol and based on copolymers that comprise at least 60% by weight of monomer units selected from the group consisting of esters of acrylic acid, esters of methacrylic acid, styrene, and substituted styrene and mixtures thereof, consisting essentially of subjecting a stabilized dispersion of a monomer mixture containing at least 60% by weight of monomers selected from the group consisting of esters of acrylic acid, esters of methacrylic acid, styrene, substituted styrene and mixtures thereof, said dispersion being an aqueous dispersion stabilized by a water-soluble polyvinyl alcohol, to polymerization at a temperature in excess of 60° C. in the presence of a free-radical-forming catalyst selected from the group consisting of (a) organic catalysts soluble in the monomers and also being at least partially water-soluble, optionally in combination with water-soluble reducing agents and (b) peroxosulfur catalysts, in such a manner that, during the entire duration of the reaction, said monomer mixture is supplied at such a rate by metering in the monomer mixture in the form of a previously obtained emulsion, that the monomer concentration is maintained at less than 20% by weight, based on the total weight of the reaction mixture, and recovering said stabilized dispersion.

It is especially advantageous and also surprising that the co-use of emulsifiers during polymerization can be completely dispensed with for the manufacture of stable dispersions of this type. This has advantages in certain uses. There is mentioned the behavior with regard to water or solvents, as well as during atomization and spray drying.

The polymers comprise at least 60% by weight, preferably at least 80% by weight, of monomer units derived from styrenes and/or from esters of acrylic acid and/or methacrylic acid with straight-chain, branched or aliphatic or cycloaliphatic alcohols having from 1 to approximately 20 carbon atoms, preferably alkanols and cycloalkanols, or with araliphatic alcohols having from 7 to approximately 20 carbon atoms, preferably phenyl-substituted alkanols.

In addition, the polymers may contain further monomer units in a total quantity of up to 40% by weight, preferably up to 20% by weight, based on the total weight of the polymers, for example, monomer units derived from monoesters or diesters of maleic acid and of fumaric acid with the above-mentioned alcohols, from alpha,beta-unsaturated carboxylic acids, particularly $\alpha,\beta$-alkenoic acids having from 3 to 8 carbon atoms, and the amides and nitriles thereof, from maleic acid anhydride, from ethylene, from vinyl esters of, preferably saturated, carboxylic acids having from 1 to 20 carbon atoms, especially straight-chain or branched alkanoic acids, from vinyl halides, and from other monomers that can be copolymerized with the (meth)acrylic acid esters and/or with styrene, and also from monomers having reactive groups, for example, N-methylolamides of lower alkenoic acids, vinylsilanes or (meth)acrylsilanes or compounds containing hydroxy, amino, carboxy, sulfonate, sulfate, keto and/or aldehyde groups.

There are mentioned, as examples of monomers, from units of which the (co)polymers of the dispersions according to the invention can be synthesized, the esters of acrylic acid and methacrylic acid with methanol, ethanol, n-propanol, isopropanol, n-butanol, sec-butanol, tert-butanol, 2-ethylhexanol and octadecanol, as well as styrene, methylstyrene, fumaric acid and maleic acid mono-esters and diesters with the above-mentioned alcohols, maleic acid anhydride, acrylamide, methacrylamide, acrylonitrile, methacrylonitrile, vinyl acetate, vinyl propionate, vinyl stearate, vinyl laurate, vinyl Versatate, N-methylol (meth)acrylamide, N-methylol allylcarbamate, hydroxyethyl (meth)acrylate, hydroxypropyl (meth)acrylate, hydroxybutyl (meth)acrylate, vinylsulfonate, allyl acetoacetate, vinyl acetoacetate, allyl diacetoacetate, vinyl diacetoacetate, and multi-functional compounds such as allyl (meth)acrylate, and allyl and vinyl compounds of glycidyl alcohol, glycols, polyols and polycarboxylic acids.

Preferably, the dispersions according to the invention are prepared from monomer mixtures that comprise at least 60% by weight, preferably at least 80% by weight, based on the total monomers, of styrenes and/or (meth) acrylic acid esters and up to 40% by weight, preferably up to 20% by weight, based on the total monomers, of the other monomers mentioned. The polymers preferably have K values of from 30 to 120, especially from 40 to 100, and minimum film-forming temperatures (MFT) of from $-20°$ to $+60°$ C., especially up to $+40°$ C.

The dispersions according to the invention preferably have solids contents (SC) of from 30% to 70% by weight and are prepared by polymerizing the monomer or monomer mixture at temperatures exceeding 60° C., preferably exceeding 65° C., generally not exceeding 100° C., and especially not exceeding 90° C., in aqueous phase using organic catalysts, especially hydroperoxides and azo compounds, that are both partially water-soluble and also oil-soluble, optionally in combination with water-soluble reducing agents, or using alkali metal or ammonium peroxosulfur compounds.

When carrying out the process according to the invention, the monomer or monomer mixture is present, in the form of an emulsion, initially in quantities of from 0 to 30% by weight, preferably from 0 to 15% by weight, and especially from 1% to 15% by weight, based on the total weight of the monomer(s), and the remainder of the monomer or monomer mixture is then metered in in the form of a previously prepared emulsion or pre-emulsion in the course of the polymerization, provided that the monomer concentration, based on the reaction mixture, does not exceed 20% by weight, especially 15% by weight. The composition of the emulsion initially present may differ from that of the emulsion metered in.

A preferred embodiment of the process according to the invention is the seed latex process.

Preferably, a polyvinyl alcohol (PVAL) is added, in quantities of from 4% to 20%, especially from 6% to 15% by weight, based on the monomers, both to the monomer preemulsion initially present and to the emulsion metered in. Preferably, the PVAL used has approximately from 200 to 2000 monomer units in the polymer molecule and a saponification number of approximately from 20 to 240. This corresponds to a degree of hydrolysis of from approximately 77 mol % to approximately 98.4 mol %.

The process according to the invention can be carried out with the addition of organic catalysts, especially hydroperoxides or azo compounds which, in each case are partially soluble both in water and in the monomers, or with the addition of inorganic water-soluble peroxosulfur catalysts. Especially suitable organic compounds of those types are tert-butyl hydroperoxide (TBHP), cumene hydroperoxide, isopropylbenzene monohydroperoxide, and azoisobutyronitrile (AIBN).

The peroxosulfur compounds mentioned are, for example, the sodium, potassium and ammonium salts of peroxosulfuric acid and of peroxodisulfuric acid, and compounds of the formula R—O—CO—O—O—SO$_3$M, in which R represents an aliphatic or cycloaliphatic radical, for example, alkyl having from 1 to 18 carbon atoms or cycloalkyl having from 5 to approximately 18 carbon atoms, and M represents sodium, potassium or ammonium.

These compounds are used preferably in quantities of from 0.05% to 3% by weight, based on the monomers. They can be present initially either partially or entirely or can be partially or entirely metered in during polymerization.

Furthermore, in a further preferred embodiment of the process according to the invention, the organic catalysts can be used in combination with substances having a reducing action, as a so-called redox catalyst system. In that case, the organic compounds mentioned are used also preferably in quantities of from 0.05% to 3% by weight, based on the monomers, and can likewise be present initially partially or entirely or alternatively can be partially or entirely metered in. As suitable reducing agents there come into consideration, for example, water-soluble phosphorus or nitrogen compounds, or especially, however, sulfur compounds, for example, alkali metal or ammonium sulfites or bisulfites, such as sodium (bi)sulfite, potassium (bi)sulfite, ammonium (bi)sulfite, and derivatives of sulfoxylic acid, such as zinc formaldehyde sulfoxylate or alkali metal formaldehyde sulfoxylates, for example, sodium hydroxymethane sulfinate. Those compounds are used optionally generally in equimolar amounts or in an up to approximately 20-fold excess or in an up to 50 percent deficiency compared with the other components of the catalyst system.

If a redox system is used as initiator, the reducing agent is preferably metered in during polymerization, especially throughout the entire period of polymerization. It is obviously also possible conjointly to use heavy metal salts in small quantities as activators.

The process according to the invention is generally carried out in reactors that can be heated and cooled, for example autoclaves, and which are provided with stirring units. The duration of the reaction can thus be controlled simply by the addition, or especially the removal, of heat, that is to say by means of the stirring system and the heating or cooling system, and by means of the catalyst system. In that connection, when using redox systems, in many cases lower temperatures are sufficient as compared with those that are preferably maintained when using the catalysts without reducing agents. In all cases, however, temperatures of approximately from 67° to 90° C. have been found especially advantageous.

In general, the polymerization is complete when an appreciable development of heat can no longer be detected and when the monomer concentration has fallen to less than 1.5% by weight, based on the solids content. In an especially preferred embodiment, the polymerization is carried out in such a manner that the residual monomer concentration is achieved as early as at the end of metering in the monomers. Subsequently, if desired, and preferably in a manner known per se, for example, by adding more initiator in quantities of approximately from 0.003% to 1% by weight, based on the solids content, post-polymerization can be carried out, for example, in order to achieve a residual monomer content of less than 0.5% by weight. Generally, in that manner, it is even possible to prepare polymers according to the process of the invention, the residual monomer content of which polymers is 0.25% or less than 0.25% by weight, based on the polymer.

The problems underlying the subject of the invention can be solved with the above-described measures, but it is also quite possible to carry out measures that are not essential to the invention in order, for example, to achieve special effects. Auxiliaries that are often co-used in known aqueous plastics dispersions, for example, for reasons of application technology, can be admixed with the dispersion according to the invention during polymerization and/or, generally and preferably, subsequently. As example of such auxiliaries are mentioned thickeners, pigments, surface-active compounds, such as emulsifiers, flame-retardants, cross-linking agents, fillers, reinforcing agents, film-promoting auxiliaries, antioxidants, stabilizers, fungicides, anti-foaming agents and coalescence auxiliaries which, in each case, can be added in the usual quantities.

The dispersions according to the invention can be used for many purposes. They have pigment stability and a generally good saponification stability, which naturally depends, for the most part, on the qualitative composition of the polymers. It is, therefore, possible to use the dispersions as binders in dispersion dyes and most of them also in hydraulically setting building materials. Furthermore, they have good adhesive strength and can therefore also be used for the manufacture of adhesives. For example, those dispersions that contain a copolymer containing methylolacrylamide are suitable, in combination with strong protonic acids, for example, phosphoric or sulfuric acid, or with salts of trivalent metal ions of inorganic acids, such as chromium nitrate or aluminum nitrate, for use as water-resistant wood glue.

The dispersions can be atomized and spray-dried and are, therefore, also suitable for the manufacture of redispersible plastics powders.

Since the dispersions dry to form films with highly glossy surfaces, they can be used, especially in combination with cross-linking agents, for coating, for example, textile materials, leather, paper, cardboard, wood, or metal.

The following Comparison Tests and Examples show that, in carrying out a process similar to the process according to the invention but using $H_2O_2$ as catalyst, alone or together with a reducing agent, in no case was it possible to obtain a dispersion having satisfactory properties. Even the generally successful measure of preventing agglomeration or coagulation by means of milder reaction conditions (lower temperatures) did not result in the desired success.

Furthermore, in contrast to the results obtained in the manufacture of dispersions of vinyl acetate homopolymers and vinyl acetate copolymers stabilized solely by PVAL and of styrene and acrylate dispersions stabilized by emulsifiers, it was also not possible to prepare useful dispersions of the (co)polymers according to the invention when using redox systems consisting of persulfate or $H_2O_2$ in each case with sodium hydroxymethane sulfinate. In this case, the residual monomer content cannot be reduced to a reasonable level, that is to say, under 0.5% by weight, for example, by adding relatively large quantities of catalyst or by post-polymerizing several times.

It is, therefore, all the more surprising that, in the present process, by raising the reaction temperature to over 60° C., especially to over 65° C., when using the special catalyst system used according to the invention and while metering in the main quantity of the monomers in the form of a previously prepared emulsion in such a manner that a certain maximum monomer concentration is not exceeded, stable emulsifier free dispersions of (co)polymers that consist, for the major part, of styrene and/or (meth) acrylic acid esters can be prepared.

EXAMPLES

The following Examples are illustrative of the practice of the invention without being limitative.

In the Examples and the Comparison Tests, all the percentages are by weight.

Examples and Comparison Tests

General Method I for the Examples and Comparison Tests listed in Table 1:

An initial portion of initiator and/or PVAL (as aqueous solutions, see Table 1) was introduced into a thermo-stabilized 2-liter graduated flask having a ground glass stopper and provided with a stirrer and a thermometer and then heated to the desired reaction temperature. Thereafter while metering in the pre-emulsion and, optionally, the aqueous solution of the reducing components of the initiator system, polymerization, which then proceeded very uniformly, was started virtually without an induction period. The continuous metering(s) was (were) adjusted in such a manner that the concentration of the monomers during the reaction was maintained in the range of approximately from 8% to 15%, based on the reaction mixture, and, at the end of the metering, polymerization was likewise virtually complete (residual monomer content of the dispersion: less than 1.5%, based on the polymer). Post-polymerization was then carried out for a further hour while adding further initiator in the usual manner. The dispersion thus obtained was then examined.

The comparison tests varied from the above in that, at the end of the metering, the polymerization was still substantially incomplete and even after post-polymerization, very little reduction in the residual monomer content occurred.

The PVAL used had a viscosity of 4 mPa.s, measured according to Höppler at 20° C. in a 4% by weight aqueous solution, and a saponification number of 140 mg KOH/gm PVAL, corresponding to a mean degree of hydrolysis of from 87 to 88 mol %. The monomer mixture of the pre-emulsion comprised 59% of n-butyl acrylate, 39% of styrene, and 1% of each of acrylic acid and acrylamide.

General Method II for the Examples of Table 2

An initial portion of initiator and/or PVAL (as aqueous solutions, see Table 2) was introduced into a thermo-stabilized 2-liter graduated flask having a ground glass stopper and provided with a stirrer and a thermometer, and then heated to the desired reaction temperature, after which approximately 5% of pre-emulsion was added, with stirring, and polymerization was started with the aqueous solution of reducing agent (Brüggolith®). The reaction started immediately. After 5 minutes, the monomer initially present had been substantially polymerized. Polymerization was then continued according to General Method I and the subsequent examination was carried out. The PVAL used corresponded to that of General Method I.

TABLE 1

| Example or Comparison Test | Initial Portion | | | Pre-emulsion | | | | Solution of reducing agent[6] | Temp. °C. | Duration of metering (min.) | Final Analysis | |
|---|---|---|---|---|---|---|---|---|---|---|---|---|
| | gm | %[1] PVAL[12] | %[1] Initiator | gm | % monomers[10] | %[10] PVAL[12] | %[10] Initiator | | | | SC[7] %[11] | RM[8] %[9] |
| A | 240 | 3.2 | 0.4[2] | 1190 | 61.5 | 4.4 | 0.3[2] | 2.5 | 50 | 115 | 25.9 | 14.8 |
| B | 240 | 3.2 | 0.4[2] | 1190 | 61.5 | 4.4 | 0.3[2] | 2.5 | 60 | 115 | 35.6 | 9.2 |
| C | 240 | 3.1 | 0.4[2] | 1175 | 62.5 | 4.3 | 0.3[2] | 2.5 | 70 | 115 | 28.7 | 12.6 |
| D | 240 | 3.1 | 1.0[3] | 1180 | 62.0 | 4.2 | 0.6[3] | 2.5 | 70 | 115 | 14.0 | 16.4 |
| E | 340 | 3.1 | 1.0[3] | 1180 | 62.0 | 4.2 | 0.6[3] | — | 80 | 115 | 38.7 | 9.2 |
| F | 340 | 2.2 | 1.1[3] | 1185 | 62.0 | 4.2 | 1.0[3] | — | 80 | 120 | 36.1 | 6.0 |
| 1 | 340 | 2.3 | 0.3[2] | 1190 | 61.5 | 4.4 | 0.3[2] | — | 67 | 115 | 50.2 | 0.7 |
| 2 | 290 | 2.7 | 0.2[2] | 1240 | 59.0 | 4.3 | 0.2[2] | — | 75 | 120 | 51.2 | 0.12 |
| G | 215 | — | 0.7[4] | 1240 | 59.0 | 4.9 | 0.5[4] | 5 | 60 | 45 | 23.3 | 12.4 |
| 3 | 215 | — | 0.7[4] | 1240 | 59.0 | 4.9 | 0.5[4] | 5 | 67 | 45 | 49.8 | 0.1 |
| 4 | 210 | — | 0.7[4] | 1240 | 59.0 | 4.7 | 0.5[4] | 5 | 70 | 45 | 50.1 | 0.21 |
| 5 | 215 | — | 0.7[4] | 1220 | 60.0 | 4.6 | 0.5[4] | 5 | 80 | 45 | 50.0 | 0.5 |
| H | 340 | 2.1 | — | 1180 | 62.0 | 4.3 | 0.3[5] | — | 65 | 115 | 36.7 | 6.0 |
| 6 | 340 | 2.1 | — | 1180 | 62.0 | 4.3 | 0.3[5] | — | 80 | 115 | 50.0 | 0.05 |
| I | 240 | 3.1 | — | 1180 | 62.0 | 4.3 | 0.3[5] | 2.5 | 65 | 120 | 36.9 | 5.7 |
| 7 | 240 | 3.0 | — | 1180 | 62.0 | 4.3 | 0.3[5] | 2.5 | 70 | 120 | 50.6 | 0.1 |

| Example or Comparison Test | Viscosity Measurements according to Brookfield | | | | Structural viscosity[13] | with Epprecht-Rheometer STV | | MFT[14] °C. | K Value | Complete Assessment |
|---|---|---|---|---|---|---|---|---|---|---|
| | stirrer | 1 min⁻¹ | 10 min⁻¹ | 20 min⁻¹ | | Beaker | Stage III (mPa.s) | | | |
| A | — | — | — | — | — | — | — | — | — | useless |
| B | — | — | — | — | — | — | — | — | — | useless |
| C | — | — | — | — | — | — | — | — | — | useless |
| D | — | — | — | — | — | — | — | — | — | useless |
| E | — | — | — | — | — | — | — | — | — | useless |
| F | — | — | — | — | — | — | — | — | — | useless |
| 1 | 6 | 134000 | 25200 | 3160 | 4.32 | D | 3103 | <0 | 98.1 | good |
| 2 | 7 | 680000 | 189200 | 118400 | 2.59 | — | — | 2 | 89.1[15] | very good |
| G | — | — | — | — | — | — | — | — | — | useless |
| 3 | 5 | 96400 | 19400 | 12040 | 3.97 | C | 1778 | 0 | 44.3 | very good |
| 4 | 5 | 48800 | 10400 | 6680 | 3.69 | C | 2059 | 0 | 45.0 | very good |
| 5 | 4 | 33400 | 7020 | 4520 | 3.76 | C | 1038 | <0 | 63.1[15] | very good |
| H | — | — | — | — | — | — | — | — | — | useless |
| 6 | 2 | 4080 | 1616 | 1304 | 1.52 | C | 655 | 1 | 57.3[15] | very good |
| I | — | — | — | — | — | — | — | — | — | useless |
| 7 | 2 | 3040 | 1200 | 966 | 1.53 | C | 507 | 0 | 56.8[15] | very good |

TABLE 2

| Example | Initial portion | | | Pre-emulsion | | | | |
|---|---|---|---|---|---|---|---|---|
| | gm | PVAL[12] %[1] | initiator[4] %[1] | gm | monomers | %[10] | PVAL[12] %[10] | initiator[4] %[10] |
| 8 | 240 | — | 0.4 | 985 | EHA | 33 | 5.9 | 0.6 |
| | | | | | BA | 36 | | |
| | | | | | HPA | 4 | | |
| | | | | | AMA | 0.1 | | |
| 9 | 300 | — | 0.3 | 955 | EHA | 34 | 10.5 | 0.5 |
| | | | | | BA | 37 | | |
| | | | | | HPA | 4 | | |
| | | | | | AMA | 0.1 | | |
| | | | | | AS | 0.9 | | |
| | | | | | AA | 0.9 | | |
| 10 | 230 | — | 0.4 | 985 | EHA | 33 | 5.9 | 0.6 |
| | | | | | BA | 36 | | |
| | | | | | HPA | 4 | | |
| | | | | | AMA | 0.1 | | |
| | | | | | AS | 0.8 | | |
| | | | | | AA | 0.8 | | |
| 11 | 230 | — | 0.4 | 990 | EHA | 32 | 5.7 | 0.6 |
| | | | | | BA | 35.5 | | |
| | | | | | HPA | 3.6 | | |
| | | | | | AMA | 0.1 | | |

TABLE 2-continued

| Example | | | | | | | | |
|---|---|---|---|---|---|---|---|---|
| | | | | | AS | 0.7 | | |
| | | | | | AA | 0.7 | | |
| | | | | | AD | 2.8 | | |
| 12 | 215 | — | 0.7 | 975 | S | 37 | 5.8 | 0.7 |
| | | | | | BA | 35 | | |
| | | | | | NMA | 2.1 | | |
| | | | | | AS | 0.7 | | |
| 13 | 145 | 9.9 | 0.65 | 870 | MA | 80 | 6.6 | 0.8 |
| | | | | | NMA | 2.5 | | |
| | | | | | AS | 0.8 | | |
| 14 | 215 | 7.1 | 0.6 | 920 | MA | 63 | 6.3 | 0.7 |
| | | | | | DBM | 16 | | |
| | | | | | AS | 0.8 | | |
| | | | | | AA | 0.8 | | |

| Example | Aqueous 2.5% solution of reducing agent[17] | Temp. °C. | Duration of metering (min.) | Final Analyses | | | K Value |
|---|---|---|---|---|---|---|---|
| | | | | SC[7] %[11] | RM[8] %[9] | MFT[14] °C. | |
| 8 | 120 | 80 | 125 | 50.2 | 0.35 | <0 | — |
| 9 | 140 | 75 | 117 | 46.7 | 0.17 | <0 | 60.7 |
| 10 | 115 | 75 | 122 | 52.2 | 0.07 | <+1 | — |
| 11 | 150 | 75 | 120 | 50.1 | 0.6 | <0 | — |
| 12 | 110 | 80 | 135 | 48.3 | 0.45 | +16.5 | — |
| 13 | 96 | 80 | 90 | 50.2 | 0.13 | <0 | 64.4 |
| 14 | 80 | 80 | 120 | 50.0 | 0.008 | +1.5 | 72.7 |

| Example | Viscosity Measurements | | | | with Epprecht-Rheometer | |
|---|---|---|---|---|---|---|
| | According to Brookfield | | | structural viscosity[13] | Beaker | Stage III (mPa.s) |
| | stirrer | 1 min$^{-1}$ | 10 min$^{-1}$ | 20 min$^{-1}$ | | | |
| 8 | 1 | 460 | 408 | 405 | 0.1 | B | 279 |
| 9 | 2 | 200 | 400 | — | — | B | 376 |
| 10 | 1 | 670 | 668 | — | — | — | — |
| 11 | 2 | 4840 | 1832 | 1462 | 1.64 | C | 767 |
| 12 | 6 | 13100 | 7300 | 2800 | 2.51 | D | 11790 |
| 13 | 4 | 19000 | 4660 | 3200 | 3.08 | C | 1031 |
| 14 | 4 | 10600 | 3060 | 2210 | 2.46 | C | 873 |

Notes on the Tables
[1] based on the total weight of the initial portion
[2] potassium persulfate
[3] hydrogen peroxide
[4] tert-butyl hydroperoxide
[5] azoisobutyronitrile
[6] aqueous solution of reducing agent: — a dash indicating no metering, otherwise in each case 100 ml with gm content of sodium formaldehyde sulfoxylate (Bruggolith®)
[7] solids content
[8] residual monomer content
[9] based on the polymer
[10] based on the total weight of the pre-emulsion
[11] based on the dispersion
[12] Polyviol® G 04/140 (Wacker-Chemie GmbH, Munich, Germany)
[13] structural viscosity =

$$\frac{\text{viscosity value (1 min}^{-1}) - \text{viscosity value (10 min}^{-1})}{\text{viscosity value (10 min}^{-1})}$$

[14] minimum film-forming temperature °C.
[15] slightly cloudy solution
[16] BA = n-butyl acrylate, EHA = ethylhexyl acrylate, HPA = hydroxypropyl acrylate, AMA = allyl methacrylate, S = styrene, NMA = N—methylol acrylamide, MA = methyl acrylate, DBM = di-n-butyl maleate, AS = acrylic acid, AA = acrylamide, AD = allyl diacetylacetate
[17] sodium formaldehyde sulfoxylate Surprisingly, the advantage of the present invention can only be achieved when not deviating from the combination of all parameters as in the claims (cf., e.g. Comparison Example C vs. Example 1).

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the production of an aqueous dispersion stabilized by a water-soluble polyvinyl alcohol and based on copolymers that comprise at least 60% by weight of monomer units selected from the group consisting of esters of acrylic acid, esters of methacrylic acid, styrene, and mixtures thereof with each other, consisting essentially of subjecting a previously prepared, stabilized dispersion of a monomer mixture containing at least 60% by weight of monomers selected from the group consisting of esters of acrylic acid, esters of methacrylic acid, styrene, and mixtures thereof with each other, said dispersion being an aqueous dispersion stabilized by a water-soluble polyvinyl alcohol employed in an amount of from 4% to 20% by weight, based on the monomers, to polymerization in the absence of emulsifiers at a temperature equal to or in excess of 67° C. in the presence of a free-radical-forming catalyst selected from the group consisting of:

(a) organic catalysts soluble in the monomers and also being at least partially water-soluble, optionally in combination with water-soluble reducing agents, and (b) inorganic, water-soluble peroxosulfur catalysts, in such a manner that, during the entire duration of the reaction, said monomer mixture is supplied at such a rate by metering in the monomer mixture in the form of a previously obtained emulsion, that the monomer concentration is maintained at less than 20% by weight, based on the total weight of the reaction mixture; and recovering said stabilized dispersion.

2. The process of claim 1 wherein said monomer mixture contains at least 80% by weight of said monomers.

3. The process of claim 1 wherein said monomer concentration is maintained at less than 15% by weight based on the total weight of the reaction mixture.

4. The process of claim 3 wherein said monomer concentration is maintained at less than 15% by weight based on the total weight of the reaction mixture.

5. The process of claim 1 wherein said water-soluble polyvinyl alcohol is employed in amounts of from 6% to 15% by weight based on the total amount of monomers and has from 200 to 2000 monomer units and a hydrolysis degree of from about 77 to 98.4 mol %.

6. The aqueous dispersion stabilized by a water-soluble polyvinyl alcohol produced by the process of claim 1.

7. The process of claim 1 wherein said temperature is maintained between 67° C. and 90° C.

* * * * *